United States Patent [19]

Arai

[11] Patent Number: 4,597,641
[45] Date of Patent: Jul. 1, 1986

[54] VARIABLE-POWER COPYING LENS
[75] Inventor: Yasunori Arai, Saitama, Japan
[73] Assignee: Asahi Kogaku Kogyo Kabushiki Kaisha, Tokyo, Japan
[21] Appl. No.: 646,700
[22] Filed: Aug. 31, 1984
[30] Foreign Application Priority Data Sep. 8, 1983 [JP] Japan ................. 58-165616

[51] Int. Cl.⁴ .................. G02B 9/64; G02B 15/14
[52] U.S. Cl. ........................... 350/425; 350/463
[58] Field of Search .................. 350/423, 425, 463

[56] References Cited

U.S. PATENT DOCUMENTS 3,883,228  5/1975  Betensky ............... 350/425
4,408,841 10/1983  Arai et al. ............. 350/425

Primary Examiner—John K. Corbin
Assistant Examiner—Scott J. Sugarman
Attorney, Agent, or Firm—Lyon & Lyon

[57] ABSTRACT

There is disclosed a variable-power copying lens including, successively in order from an object, a first lens group having a positive focal length and a second lens group having a negative focal length. The first and second lens groups are movable in their entirety while varying an interval therebetween to keep constant the distance between an object surface and an image-focusing surface. The first lens group comprises a first positive lens, a second negative lens, a third positive lens, a fourth negative lens, and a fifth positive lens. The second lens group comprises a sixth positive-meniscus lens having a convex surface facing an image and a seventh negative-meniscus lens having a convex surface facing the image.

6 Claims, 12 Drawing Figures

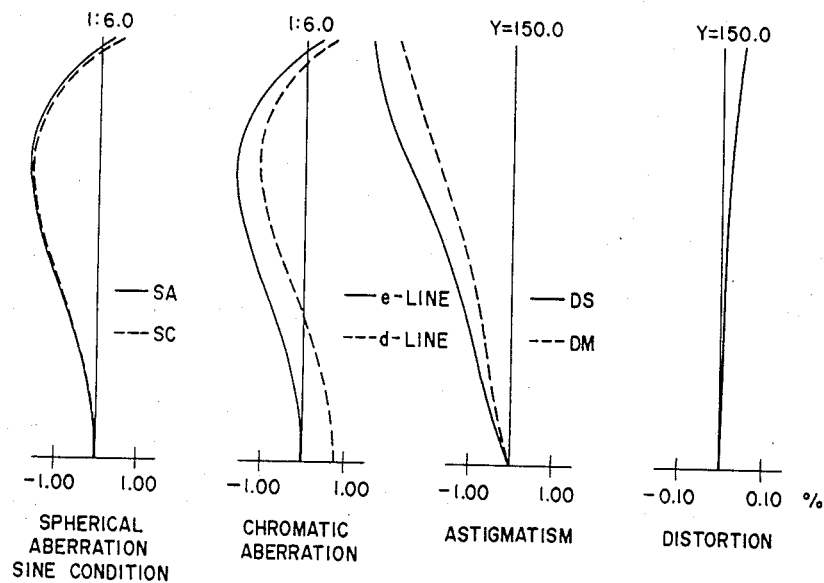
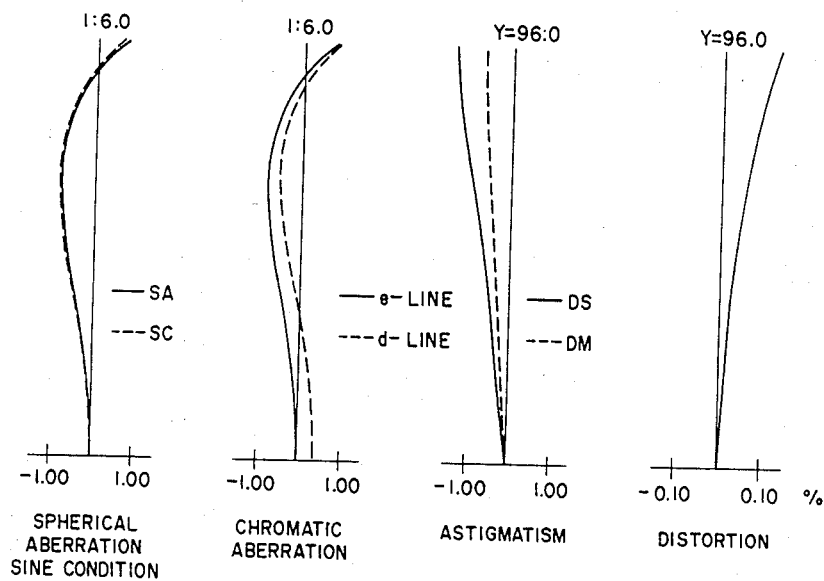

VARIABLE-POWER COPYING LENS

The present invention relates to a variable-power copying lens having an $F_{NO}$ in the range of 1:6–6.7 and used in a focusing optical system in a copying machine or the like for obtaining enlarged and reduced images while keeping constant the distance between an object surface and an image-focusing surface.

Conventional variable-power copying lenses are disclosed in Japanese Patent Publication No. 58-13887 and Japanese Laid-Open Patent Publication No. 57-68810. The lens disclosed in the former publication comprises a variable-power two-group lens system. Since a negative lens group serves as a first lens group and a positive lens group as a second lens group, the distance between the object and the lens is smaller as compared with the distance between the lens and the image-focusing surface. The lens is disadvantageous from the standpoint of space availability such as in a copying machine in which a scanning mirror is disposed between the object surface and the lens. The lens disclosed in the latter publication eliminates such a short coming as it provides better space availability in a copying machine, and allows a small-size copying machine to be constructed.

The positive lens group in the prior lens system is basically of a so-called split Dagor type having a four-group six-element arrangement. In the split-type, the lens system is substantially symmetrical with respect to an aperture and has lens surfaces concentric with the aperture, so that a wide angle of view can be attained. However, outer joined lenses are thick and hence the lens system has an increased length. Since copying lenses are required to have an aperture efficiency in the range from 95 to 100%, the long lens system results in an increased outside lens diameter, a large size, and an increased cost, which are serious problems with the prior lens systems.

Accordingly, it is an object of this invention to provide an improved variable-power copying lens.

It is another object of the present invention to provide a variable-power copying lens which is small in size, inexpensive, a large ratio of power variation, and good performance.

These and other objects of the present invention will become better understood through a consideration of the following description taken in conjunction with the drawings in which:

FIG. 3 is a diagram showing aberrations of the lens of Example 1 at a magnification of $-1.41\times$;

FIG. 4 is a diagram showing aberrations of the lens of Example 1 at a magnification of $-0.64\times$;

Figure 1:
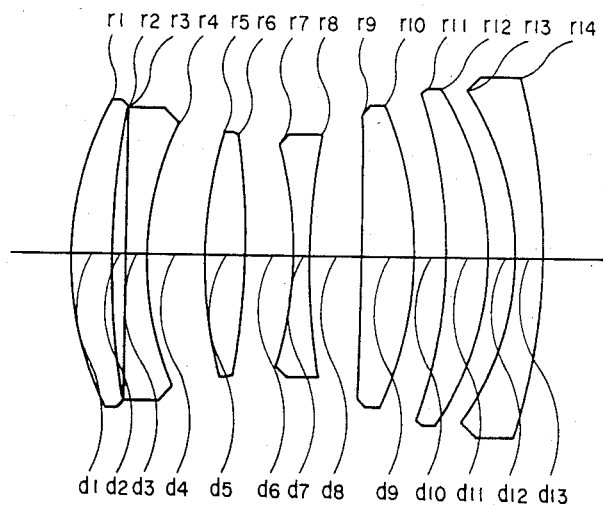
FIG. 1 is a cross-sectional view of a lens according to an Example 1 of the present invention.
Figure 2:
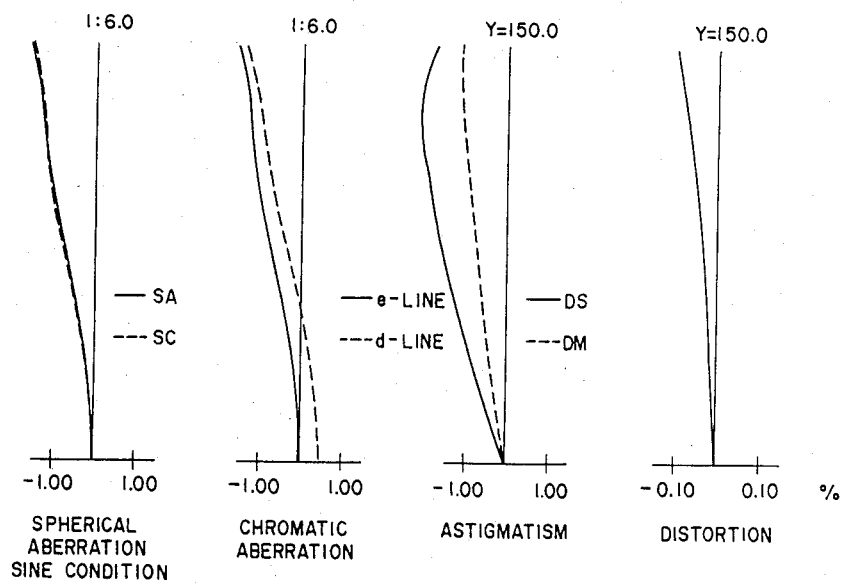
FIG. 2 is a diagram showing aberrations of the lens of Example 1 at a magnification of $-1.00\times$.
Figure 5:
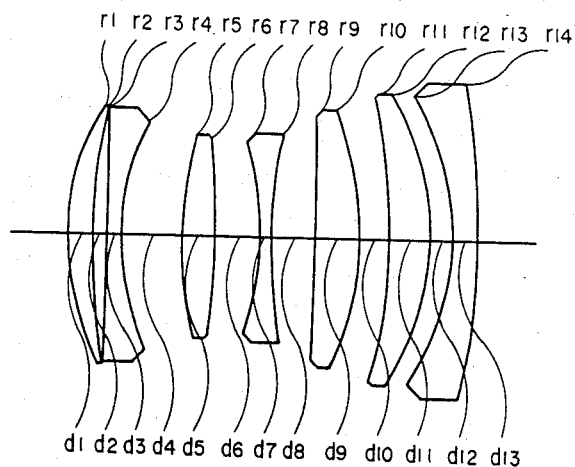
FIG. 5 is a cross-sectional view of a lens according to Example 2 of the present invention.
Figure 6:
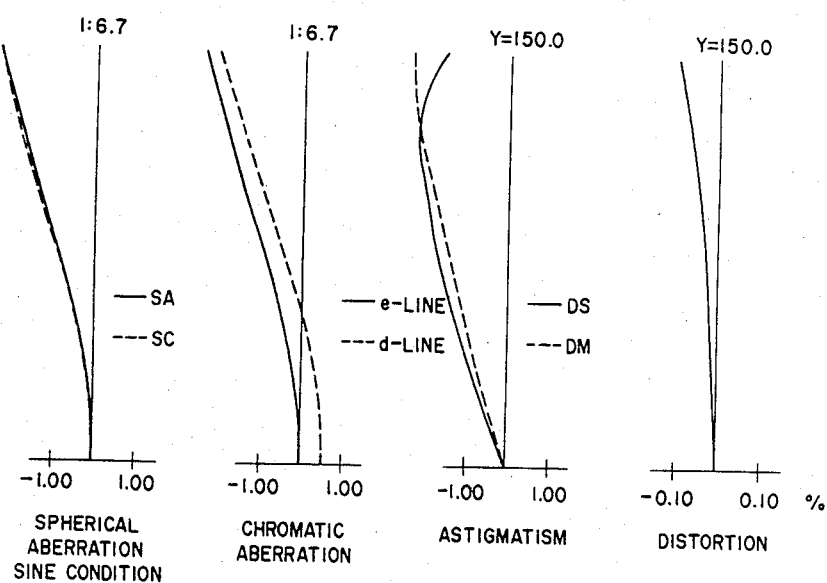
FIG. 6 is a diagram showing aberrations of the lens of Example 2 at a magnification of $-1.00\times$.
Figure 7:
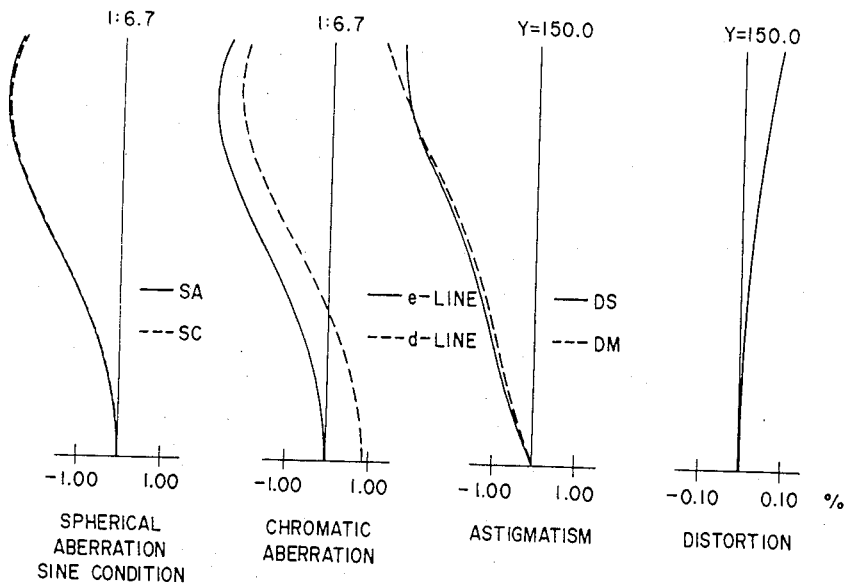
FIG. 7 is a diagram showing aberrations of the lens of Example 2 at a magnification of $-1.41\times$.
Figure 8:
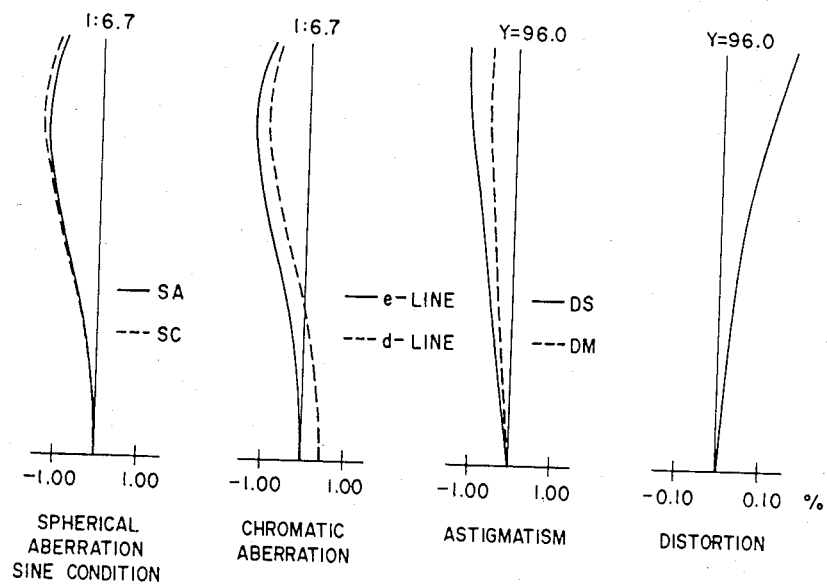
FIG. 8 is a diagram showing aberrations of the lens of Example 2 at a magnification of $-0.64\times$.
Figure 9:
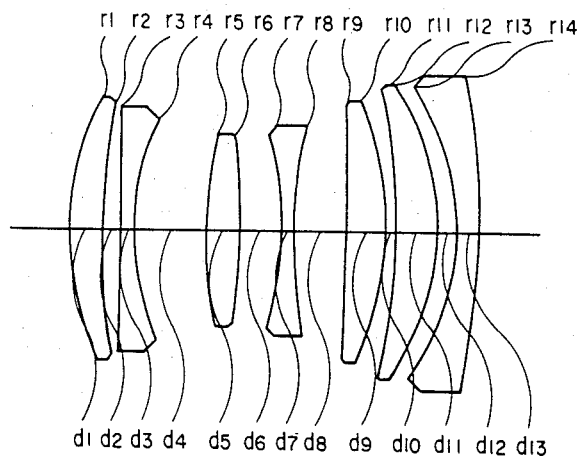
FIG. 9 is a cross-sectional view of a lens according to Example 3 of the present invention.
Figure 10:
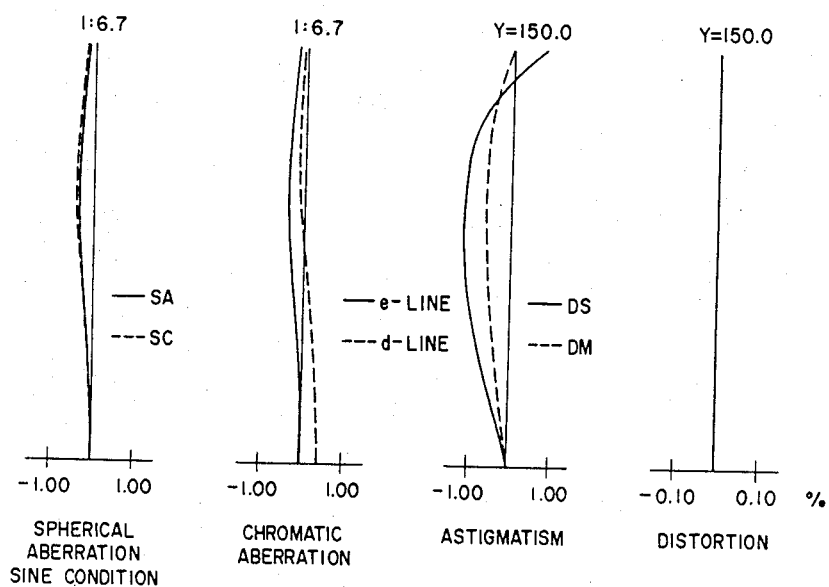
FIG. 10 is a diagram showing aberrations of the lens of Example 3 at a magnification of $-1.00\times$.
Figure 11:
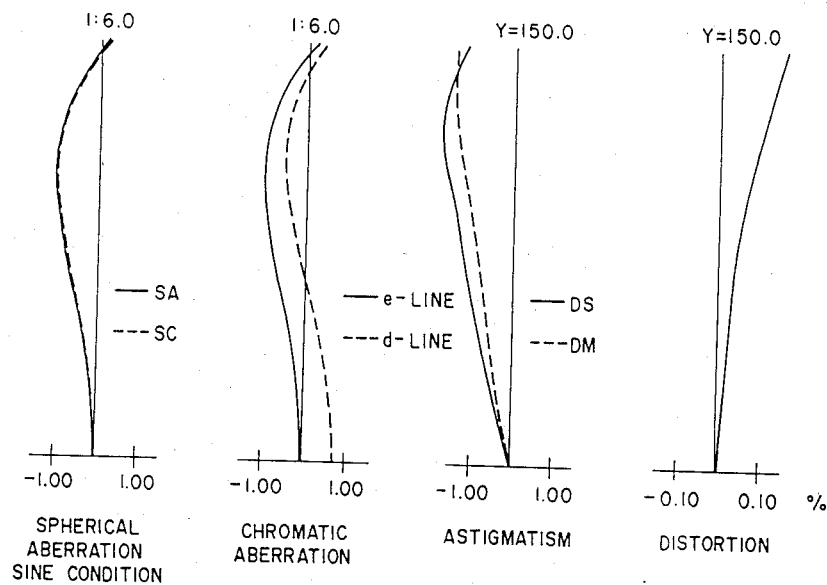
FIG. 11 is a diagram showing aberrations of the lens of Example 3 at a magnification of $-1.41\times$.
Figure 12:
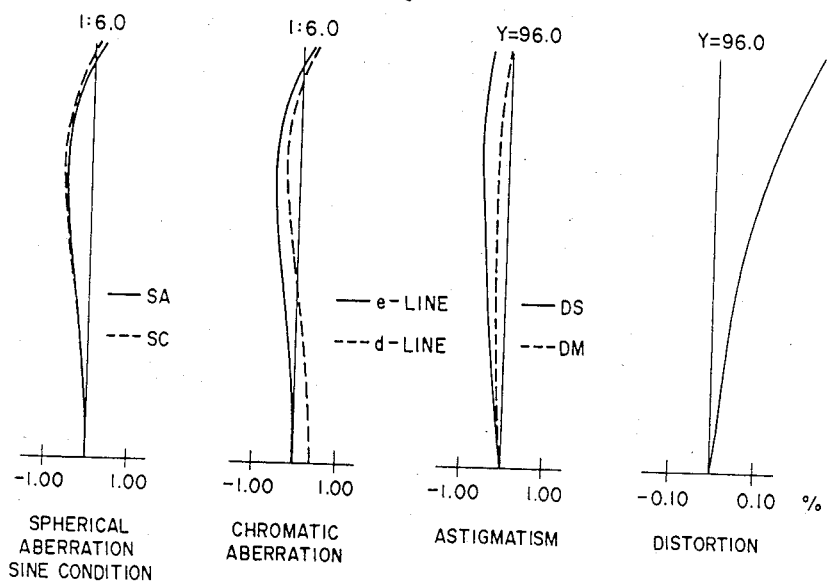
FIG. 12 is a diagram showing aberrations of the lens of Example 2 at a magnification of $-0.64\times$.

According to the present invention, a variable-power copying lens includes, successively in order from an object, a first lens group having a positive focal length and a second lens group having a negative focal length, said first and second lens groups being movable in their entirety while varying an interval therebetween to keep constant the distance between an object surface and an image-focusing surface, characterized in that said first lens group comprises a first positive lens, a second negative lens, a third positive lens, a fourth negative lens, and a fifth positive lens, and said second lens group comprises a sixth positive-meniscus lens having a convex surface facing an image and a seventh negative-meniscus lens having a convex surface facing the image, said variable-power copying lens meeting the following conditions:

$$0.60 < \frac{f_I}{f_{max}} < 0.75 \qquad (1)$$

$$0.20 < \frac{f_3}{f_I} < 0.70 \qquad (2)$$

$$0.25 < \frac{f_6}{|f_{II}|} < 0.50 \qquad (3)$$

$$0.02 < \frac{N_1 + N_3 + N_5}{3} - \frac{N_2 + N_4}{2} < 0.12 \qquad (4)$$

$$6 < \frac{\nu_1 + \nu_3 + \nu_5}{3} - \frac{\nu_2 + \nu_4}{2} < 18 \qquad (5)$$

$$0.03 < N_7 - N_6 < 0.16 \qquad (6)$$

$$0 < \nu_7 - \nu_6 < 10 \qquad (7)$$

where
$f_I$: the focal length of the first positive lens group;
$f_{II}$: the focal length of the second negative lens group;
$f_{max}$: the focal length of the entire lens system at $1.00\times$;
$f_i$: the focal length of the ith lens from the object;
$N_i$, $\nu_i$: the refractive index at e line and Abbe number of the ith lens from the object.

The above conditions will now be described.

The lens of the present invention is a two-group zoom lens in which power arrangement of the two groups and power distribution in each lens group are of consequence. The conditions (1) through (3) are concerned with the power arrangement.

The condition (1) is directed to the power of the first positive lens group. If the upper limit were exceeded, the power of each of the first positive lens group and the second negative lens group would be reduced, a feature which would be effective in correction of aberrations, but the distance between the lens groups would vary to a large extent at the time of varying power, the lens system would be long at the end of an enlargement or reduction mode, and hence the outside lens diameter would be increased. If the lower limit were exceeded, the lens could be smaller in size, but the burden on the positive and negative lens groups would be increased, making it difficult to correct various aberrations such as distortion.

The condition (2) deals with the power of the third positive lens in the first positive lens group. The first lens group in its entirety has a considerable strong power as indicated by the condition (2). It is important to distribute the power properly among the first, third, and fifth positive lenses. The power of the third positive lens is of particular importance. If the upper limit in the condition (2) were exceeded, the powers of the first and fifth lenses would have to be increased by a reduction in the power of the third lens. This would result in excessive generation of spherical aberration and coma by the first surface ($r_1$) of the first lens and the second surface ($r_{10}$) of the fifth lens. If the lower limit were exceeded, both surfaces ($r_5$, $r_6$) of the the third lens would produce increased spherical aberration and coma, and no good aberration correction would be possible.

The condition (3) is related to the power of the sixth positive lens in the second negative lens group. If the upper limit in the condition (3) were exceeded, the power of the sixth lens would be lessened, and the power of the seventh negative lens could also be reduced. However, chromatic aberration could only insufficiently be corrected. If the lower limit were exceeded, excessive spherical aberration would be produced by the second surface ($r_{12}$) of the sixth lens and the first surface ($r_{13}$) of the seventh lens, and chromatic aberration would excessively be corrected.

The conditions (4) through (7) are primarily concerned with correction of chromatic aberration and curvature of field.

The condition (4) serves as a condition for correcting the Petzval sum in the first lens group. If the upper limit of the condition (4) were exceeded, the Petzval sum would become insufficient, and the curvature of field would excessively be corrected. If the lower limit were exceeded, the curvature of field would insufficiently be corrected, a disadvantage for a lens such as copying lens required to have uniform performance throughout the entire image plane.

The condition (5) is a condition for correcting chromatic aberration in the first lens group. If the upper limit of the condition (5) were exceeded to have a large difference between the Abbe numbers of the positive and negative lenses, the positive lens would have to be made of an expensive high-refraction low-dispersion glass material as with the condition (4), and chromatic aberration would insufficiently be corrected. If the lower limit were exceeded, the power of each lens in the first lens would have to be kept strong for correcting chromatic aberration, and hence no good performance would be maintained.

The conditions (6) and (7) are conditions for correcting Petzval sum and chromatic aberration in the second negative group. In zoom lens systems, it is necessary to correct aberrations in each lens group. Particularly, the correction of curvature of field and chromatic aberration is important in that it can reduce a performance variation and keep good performance at the time of power variation.

If the upper limit were exceeded in the condition (6), the Petzval sum would not sufficiently be corrected, and if the lower limit were exceeded, the Petzval sum would excessively be corrected. At any rate, aberrations would vary to a large extent at the time of varying power.

If the upper limit were exceeded in the condition (7), the chromatic aberration would not sufficiently be corrected, and if the lower limit were exceeded, the chromatic aberration would excessively be corrected. At any rate, aberrations would vary to a large extent at the time of varying power.

The variable-power copying lens of the invention which is small in size, inexpensive, and of good performance can be achieved by meeting the above conditions (1) through (7). Furthermore, better performance can be maintained by meeting the following conditions (8), (9) and (10):

$$0.8 < \frac{f_1}{f_5} < 1.9 \tag{8}$$

$$0.44 < \left|\frac{r_5}{r_6}\right| < 0.70 \tag{9}$$

$$0.085 < \frac{f_{12}}{f_{II}} < 0.18 \tag{10}$$

where $r_i$ is the radius of curvature of the ith surface from the object.

The condition (8) defines power symmetry of the positive lens group. If the upper limit were exceeded, the burden on the fifth lens would be too large, with the consequences that the spherical aberration would be excessive and the symmetry would greatly be impaired resulting in highly negative distortion. If the lower limit were exceeded, the burden on the first lens would be excessively strong, and the distortion would become highly positive.

The condition (9) is directed to symmetry of the third positive lens. If the upper limit were exceeded, the surface power of the fifth surface ($r_5$) would be excessive, with the results that spherical aberration and coma would excessively be produced and distortion would become negative. If the lower limit were exceeded, the surface power of the sixth surface ($r_6$) would become excessive, and hence the spherical aberration would be corrected highly insufficiently, and the distortion would become positive and large.

If the upper limit were exceeded in the condition (10), the spherical aberration would be corrected highly excessively. If the lower limit were exceeded, the spherical aberration would be corrected highly insufficiently, and it would be extremely difficult to form the second surface ($r_{12}$) of the sixth lens and the first surface ($r_{13}$) of the seventh lens.

The lens of the present invention, as described above, comprises a first positive lens group and a second negative lens group arranged successively from an object. The object of the invention can be achieved by meeting the foregoing conditions. The good performance can be maintained as well by interchanging the object surface and the image surface or attaching the lens system inversely.

It is possible to use the lens system of the invention in an inverted fashion in a copying machine in which the distance between the object surface and the lens should be smaller than the distance between the lens and the image-focusing surface.

Examples of the present invention will hereinafter be described. Designated at $r_i$ is the radius of curvature of the ith surface from the object, $d_i$ the ith lens thickness or inter-lens interval from the object, and $N_i$ and $\nu_i$ the refractive index at e line and the Abbe number, respectively, of the ith lens from the object.

[Example 1]

$F_{NO}$: 1:6  $f_{max} = 227.218$
Magnification ratio $= -1.41 \times$ through $-0.64 \times$

| | | | | | | | |
|---|---|---|---|---|---|---|---|
| $r_1$ | 54.668 | $d_1$ | 6.97 | $N_1$ | 1.62287 | $\nu_1$ | 60.3 |
| $r_2$ | 142.646 | $d_2$ | 2.47 | | | | |
| $r_3$ | −1271.968 | $d_3$ | 3.00 | $N_2$ | 1.54345 | $\nu_2$ | 47.2 |
| $r_4$ | 48.599 | $d_4$ | 9.99 | | | | |
| $r_5$ | 69.878 | $d_5$ | 7.06 | $N_3$ | 1.67000 | $\nu_3$ | 48.3 |
| $r_6$ | −127.660 | $d_6$ | 8.43 | | | | |
| $r_7$ | −60.312 | $d_7$ | 2.50 | $N_4$ | 1.62409 | $\nu_4$ | 36.3 |
| $r_8$ | 112.013 | $d_8$ | 8.83 | | | | |
| $r_9$ | −806.748 | $d_9$ | 9.26 | $N_5$ | 1.65141 | $\nu_5$ | 53.0 |
| $r_{10}$ | −57.890 | $d_{10}$ | 5.00−20.28 | | | | |
| $r_{11}$ | −87.535 | $d_{11}$ | 7.66 | $N_6$ | 1.61686 | $\nu_6$ | 37.0 |
| $r_{12}$ | −48.720 | $d_{12}$ | 4.76 | | | | |
| $r_{13}$ | −47.979 | $d_{13}$ | 4.00 | $N_7$ | 1.70557 | $\nu_7$ | 41.2 |
| $r_{14}$ | −114.707 | | | | | | |

$$\frac{f_I}{f_{max}} = 0.683$$

$$\frac{f_3}{f_I} = 0.301$$

$$\frac{f_6}{|f_{II}|} = 0.403$$

$$\frac{N_1 + N_3 + N_5}{3} - \frac{N_2 + N_4}{2} = 0.06612$$

$$\frac{\nu_1 + \nu_3 + \nu_5}{3} - \frac{\nu_2 + \nu_4}{2} = 12.1$$

$$\frac{f_1}{f_5} = 1.450$$

$$\frac{r_{12}}{f_{II}} = 0.119$$

[Example 2]

$F_{NO}$: 1:6.7  $f_{max} = 207.361$
Magnification ratio $= -1.41 \times$ through $-0.64 \times$

| | | | | | | | |
|---|---|---|---|---|---|---|---|
| $r_1$ | 46.168 | $d_1$ | 4.23 | $N_1$ | 1.60548 | $\nu_1$ | 60.7 |
| $r_2$ | 133.789 | $d_2$ | 2.16 | | | | |
| $r_3$ | −666.586 | $d_3$ | 2.50 | $N_2$ | 1.54345 | $\nu_2$ | 47.2 |
| $r_4$ | 44.700 | $d_4$ | 10.42 | | | | |
| $r_5$ | 69.752 | $d_5$ | 5.72 | $N_3$ | 1.70346 | $\nu_3$ | 48.1 |
| $r_6$ | −118.653 | $d_6$ | 7.22 | | | | |
| $r_7$ | −55.070 | $d_7$ | 2.25 | $N_4$ | 1.62409 | $\nu_4$ | 36.3 |
| $r_8$ | 105.470 | $d_8$ | 7.19 | | | | |
| $r_9$ | −538.830 | $d_9$ | 7.41 | $N_5$ | 1.66152 | $\nu_5$ | 50.9 |
| $r_{10}$ | −52.737 | $d_{10}$ | 5.00−16.70 | | | | |
| $r_{11}$ | −95.041 | $d_{11}$ | 6.96 | $N_6$ | 1.61686 | $\nu_6$ | 37.0 |
| $r_{12}$ | −44.695 | $d_{12}$ | 4.06 | | | | |
| $r_{13}$ | −43.275 | $d_{13}$ | 4.00 | $N_7$ | 1.70557 | $\nu_7$ | 41.2 |
| $r_{14}$ | −130.527 | | | | | | |

$$\frac{f_I}{f_{max}} = 0.658$$

$$\frac{f_3}{f_I} = 0.553$$

$$\frac{f_6}{|f_{II}|} = 0.397$$

$$\frac{N_1 + N_3 + N_5}{3} - \frac{N_2 + N_4}{2} = 0.07305$$

$$\frac{\nu_1 + \nu_3 + \nu_5}{3} - \frac{\nu_2 + \nu_4}{2} = 11.5$$

$$\frac{f_1}{f_5} = 1.302$$

$$\frac{r_{12}}{f_{II}} = 0.137$$

[Example 3]

$F_{NO}$: 1:6.7  $f_{max} = 207.741$
Magnification ratio $= -1.41 \times$ through $-0.64 \times$

| | | | | | | | |
|---|---|---|---|---|---|---|---|
| $r_1$ | 47.915 | $d_1$ | 5.50 | $N_1$ | 1.64254 | $\nu_1$ | 60.1 |
| $r_2$ | 137.919 | $d_2$ | 3.02 | | | | |
| $r_3$ | −767.423 | $d_3$ | 2.50 | $N_2$ | 1.59911 | $\nu_2$ | 39.2 |
| $r_4$ | 47.434 | $d_4$ | 11.53 | | | | |
| $r_5$ | 73.483 | $d_5$ | 5.57 | $N_3$ | 1.80401 | $\nu_3$ | 42.2 |
| $r_6$ | −128.317 | $d_6$ | 7.07 | | | | |
| $r_7$ | −60.754 | $d_7$ | 2.25 | $N_4$ | 1.65407 | $\nu_4$ | 39.4 |
| $r_8$ | 98.491 | $d_8$ | 8.56 | | | | |
| $r_9$ | −443.401 | $d_9$ | 6.50 | $N_5$ | 1.64254 | $\nu_5$ | 60.1 |
| $r_{10}$ | −55.939 | $d_{10}$ | 2.00−16.18 | | | | |
| $r_{11}$ | −99.604 | $d_{11}$ | 6.70 | $N_6$ | 1.59911 | $\nu_6$ | 39.2 |
| $r_{12}$ | −44.025 | $d_{12}$ | 3.17 | | | | |
| $r_{13}$ | −43.207 | $d_{13}$ | 4.00 | $N_7$ | 1.70557 | $\nu_7$ | 41.2 |
| $r_{14}$ | −125.083 | | | | | | |

$$\frac{f_I}{f_{max}} = 0.687$$

$$\frac{f_3}{f_I} = 0.412$$

$$\frac{f_6}{|f_{II}|} = 0.333$$

$$\frac{N_1 + N_3 + N_5}{3} - \frac{N_2 + N_4}{2} = 0.06977$$

$$\frac{\nu_1 + \nu_3 + \nu_5}{3} - \frac{\nu_2 + \nu_4}{2} = 14.8$$

$$\frac{f_1}{f_5} = 1.128$$

$$\frac{r_{12}}{f_{II}} = 0.116$$

What is claimed is:

1. A variable-power copying lens including, successively in order from an object, a first lens group having a positive focal length and a second lens group having a negative focal length, said first and second lens groups being movable in their entirety while varying an interval therebetween to keep constant the distance between an object surface and an image-focusing surface, characterized in that said first lens group comprises a first positive lens, a second negative lens, a third positive lens, a fourth negative lens, and a fifth positive lens, and said second lens group comprises a sixth positive-meniscus lens having a convex surface facing an image and a seventh negative-meniscus lens having a convex surface facing the image, said variable-power copying lens meeting the following conditions:

$$0.60 < \frac{f_I}{f_{max}} < 0.75 \qquad (1)$$

$$0.20 < \frac{f_3}{f_I} < 0.70 \qquad (2)$$

$$0.25 < \frac{f_6}{|f_{II}|} < 0.50 \qquad (3)$$

$$0.02 < \frac{N_1 + N_3 + N_5}{3} - \frac{N_2 + N_4}{2} < 0.12 \qquad (4)$$

-continued $$6 < \frac{\nu_1 + \nu_3 + \nu_5}{3} - \frac{\nu_2 + \nu_4}{2} < 18 \quad (5)$$

$$0.03 < N_7 - N_6 < 0.16 \quad (6)$$

$$0 < \nu_7 - \nu_6 < 10 \quad (7)$$

where
$f_I$: the focal length of the first positive lens group;
$f_{II}$: the focal length of the second negative lens group;
$f_{max}$: the focal length of the entire lens system at $1.00\times$;
$f_i$: the focal length of the ith lens from the object;
$N_i$, $\nu_i$: the refractive index at e line and Abbe number of the ith lens from the object.

2. A variable-power copying lens according to claim 1, wherein the lens further meets the following conditions:

$$0.8 < \frac{f_1}{f_5} < 1.9 \quad (8)$$

$$0.44 < \left|\frac{r_5}{r_6}\right| < 0.70 \quad (9)$$

$$0.085 < \frac{f_{12}}{f_{II}} < 0.18 \quad (10)$$

3. A variable-power copying lens according to claim 1 wherein the lens has the following characteristics:

| | | | | | | |
|---|---|---|---|---|---|---|
| $r_1$ | 54.668 | $d_1$ | 6.97 | $N_1$ | 1.62287 | $\nu_1$ | 60.3 |
| $r_2$ | 142.646 | $d_2$ | 2.47 | | | |
| $r_3$ | −1271.968 | $d_3$ | 3.00 | $N_2$ | 1.54345 | $\nu_2$ | 47.2 |
| $r_4$ | 48.599 | $d_4$ | 9.99 | | | |
| $r_5$ | 69.878 | $d_5$ | 7.06 | $N_3$ | 1.67000 | $\nu_3$ | 48.3 |
| $r_6$ | −127.660 | $d_6$ | 8.43 | | | |
| $r_7$ | −60.312 | $d_7$ | 2.50 | $N_4$ | 1.62409 | $\nu_4$ | 36.3 |
| $r_8$ | 112.013 | $d_8$ | 8.83 | | | |
| $r_9$ | −806.748 | $d_9$ | 9.26 | $N_5$ | 1.65141 | $\nu_5$ | 53.0 |
| $r_{10}$ | −57.890 | $d_{10}$ | 5.00–20.28 | | | |
| $r_{11}$ | −87.535 | $d_{11}$ | 7.66 | $N_6$ | 1.61686 | $\nu_6$ | 37.0 |
| $r_{12}$ | −48.720 | $d_{12}$ | 4.76 | | | |
| $r_{13}$ | −47.979 | $d_{13}$ | 4.00 | $N_7$ | 1.70557 | $\nu_7$ | 41.2 |
| $r_{14}$ | −114.707 | | | | | | where $r_i$ is the radius of curvature of the ith surface from the object and $d_i$ is the ith lens thickness or inter-lens interval from the object.

4. A variable-power copying lens according to claim 1 wherein the lens has the following characteristics:

| | | | | | | |
|---|---|---|---|---|---|---|
| $r_1$ | 46.168 | $d_1$ | 4.23 | $N_1$ | 1.60548 | $\nu_1$ | 60.7 |
| $r_2$ | 133.789 | $d_2$ | 2.16 | | | |
| $r_3$ | −666.586 | $d_3$ | 2.50 | $N_2$ | 1.54345 | $\nu_2$ | 47.2 |
| $r_4$ | 44.700 | $d_4$ | 10.42 | | | |
| $r_5$ | 69.752 | $d_5$ | 5.72 | $N_3$ | 1.70346 | $\nu_3$ | 48.1 |
| $r_6$ | −118.653 | $d_6$ | 7.22 | | | |
| $r_7$ | −55.070 | $d_7$ | 2.25 | $N_4$ | 1.62409 | $\nu_4$ | 36.3 |
| $r_8$ | 105.470 | $d_8$ | 7.19 | | | |
| $r_9$ | −538.830 | $d_9$ | 7.41 | $N_5$ | 1.66152 | $\nu_5$ | 50.9 |
| $r_{10}$ | −52.737 | $d_{10}$ | 5.00–16.70 | | | |
| $r_{11}$ | −95.041 | $d_{11}$ | 6.96 | $N_6$ | 1.61686 | $\nu_6$ | 37.0 |
| $r_{12}$ | −44.695 | $d_{12}$ | 4.06 | | | |
| $r_{13}$ | −43.275 | $d_{13}$ | 4.00 | $N_7$ | 1.70557 | $\nu_7$ | 41.2 |
| $r_{14}$ | −130.527 | | | | | | where $r_i$ is the radius of curvature of the ith surface from the object and $d_i$ is the ith lens thickness or inter-lens interval from the object.

5. A variable-power copying lens according to claim 1 wherein the lens has the following characteristics:

| | | | | | | |
|---|---|---|---|---|---|---|
| $r_1$ | 47.915 | $d_1$ | 5.50 | $N_1$ | 1.64254 | $\nu_1$ | 60.1 |
| $r_2$ | 137.919 | $d_2$ | 3.02 | | | |
| $r_3$ | −767.423 | $d_3$ | 2.50 | $N_2$ | 1.59911 | $\nu_2$ | 39.2 |
| $r_4$ | 47.434 | $d_4$ | 11.53 | | | |
| $r_5$ | 73.483 | $d_5$ | 5.57 | $N_3$ | 1.80401 | $\nu_3$ | 42.2 |
| $r_6$ | −128.317 | $d_6$ | 7.07 | | | |
| $r_7$ | −60.754 | $d_7$ | 2.25 | $N_4$ | 1.65407 | $\nu_4$ | 39.4 |
| $r_8$ | 98.491 | $d_8$ | 8.56 | | | |
| $r_9$ | −443.401 | $d_9$ | 6.50 | $N_5$ | 1.64254 | $\nu_5$ | 60.1 |
| $r_{10}$ | −55.939 | $d_{10}$ | 2.00–16.18 | | | |
| $r_{11}$ | −99.604 | $d_{11}$ | 6.70 | $N_6$ | 1.59911 | $\nu_6$ | 39.2 |
| $r_{12}$ | −44.025 | $d_{12}$ | 3.17 | | | |
| $r_{13}$ | −43.207 | $d_{13}$ | 4.00 | $N_7$ | 1.70557 | $\nu_7$ | 41.2 |
| $r_{14}$ | −125.083 | | | | | | where $r_i$ is the radius of curvature of the ith surface from the object and $d_i$ is the ith lens thickness or inter-lens interval from the object.

6. A variable-power copying lens according to claim 1, 2, 3, 4 or 5, wherein the object and image surfaces are interchanged.

* * * * *